United States Patent
Lundy et al.

(10) Patent No.: US 12,403,829 B2
(45) Date of Patent: Sep. 2, 2025

(54) LOW PROFILE INSIDE MIRROR WITH MOUNT FIXED TO A SUBSTRATE OF A MIRROR ELEMENT

(71) Applicant: Gentex Corporation, Zeeland, MI (US)

(72) Inventors: Eric S. Lundy, Holland, MI (US); Nigel T. Lock, Holland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 32 days.

(21) Appl. No.: 18/502,281

(22) Filed: Nov. 6, 2023

(65) Prior Publication Data
US 2024/0190343 A1    Jun. 13, 2024

Related U.S. Application Data

(60) Provisional application No. 63/386,792, filed on Dec. 9, 2022.

(51) Int. Cl.
*B60R 1/04* (2006.01)

(52) U.S. Cl.
CPC ...................... *B60R 1/04* (2013.01)

(58) Field of Classification Search
CPC .................. B60R 1/04; B60R 1/088
See application file for complete search history.

(56) References Cited

U.S. PATENT DOCUMENTS

| | | | |
|---|---|---|---|
| 6,318,870 B1 * | 11/2001 | Spooner | B60R 1/086 359/872 |
| 6,698,905 B1 * | 3/2004 | Whitehead | B60R 1/087 359/872 |
| 2010/0091509 A1 | 4/2010 | DeLine et al. | |
| 2011/0242667 A1 | 10/2011 | Kulas et al. | |
| 2013/0088884 A1 | 4/2013 | Brummel et al. | |
| 2014/0133043 A1 | 5/2014 | Watson | |
| 2015/0251605 A1 * | 9/2015 | Uken | H04N 23/51 248/467 |
| 2015/0334354 A1 * | 11/2015 | Uken | B60R 1/04 348/148 |
| 2018/0086269 A1 * | 3/2018 | Uken | B29C 45/1704 |
| 2020/0047673 A1 * | 2/2020 | Uken | B60R 1/12 |
| 2023/0076687 A1 * | 3/2023 | Uken | B60R 25/252 |
| 2023/0111985 A1 * | 4/2023 | Steffes | B60R 1/04 359/265 |
| 2023/0398934 A1 * | 12/2023 | De Wind | B24B 9/02 |

FOREIGN PATENT DOCUMENTS

WO     2019153439 A1    8/2019

* cited by examiner

*Primary Examiner* — Monica E Millner
(74) *Attorney, Agent, or Firm* — Price Heneveld LLP; Brian James Brewer (57) ABSTRACT

A rearview mirror assembly for a vehicle is provided, including: a mirror element having at least one substrate including a front surface and a rear surface; a mounting mechanism configured to be mounted to the vehicle, the mounting mechanism including a ball stud and a socket for receiving a ball of the ball stud, wherein the mounting mechanism is further configured such that one of the ball stud and the socket is adhesively attached to the rear surface of the substrate; and a mirror housing secured to the mirror element so as to extend behind the rear surface of the substrate and around the one of the ball stud and the socket that is attached to the rear surface.

16 Claims, 10 Drawing Sheets

LOW PROFILE INSIDE MIRROR WITH MOUNT FIXED TO A SUBSTRATE OF A MIRROR ELEMENT

CROSS-REFERENCE TO RELATED APPLICATION

This application claims priority under 35 U.S.C. § 119(e) upon U.S. Provisional Patent Application No. 63/386,792, entitled "LOW PROFILE INSIDE MIRROR WITH MOUNT FIXED TO GLASS" filed on Dec. 9, 2022, by Eric S. Lundy et al., the entire disclosure of which is incorporated herein by reference.

TECHNOLOGICAL FIELD

The present invention generally relates to a rearview mirror for a vehicle, and more particularly relates to a mounting configuration for such a rearview mirror.

SUMMARY OF THE DISCLOSURE

According to one aspect of the present disclosure, a rearview mirror assembly for a vehicle is provided where the mirror assembly includes: a mirror element having at least one substrate including a front surface and a rear surface; a mounting mechanism configured to be mounted to the vehicle, the mounting mechanism including a ball stud and a socket for receiving a ball of the ball stud, wherein the mounting mechanism is further configured such that one of the ball stud and the socket is adhesively attached to the rear surface of the substrate; and a mirror housing secured to the mirror element so as to extend behind the rear surface of the substrate and around the one of the ball stud and the socket that is attached to the rear surface.

Either an adhesive layer or an adhesive pad may be provided between the rear surface of the substrate and the one of the ball stud and the socket that is attached to the rear surface.

According to another aspect of the present disclosure, a rearview mirror assembly for a vehicle is provided where the mirror assembly includes: an electrochromic mirror element having a first substrate and a second substrate behind the first substrate, the second substrate including a front surface and a rear surface; a mounting mechanism configured to be mounted to the vehicle, the mounting mechanism including a ball stud and a socket for receiving a ball of the ball stud, wherein the mounting mechanism is further configured such that one of the ball stud and the socket includes a mounting plate that is adhesively attached to the rear surface of the second substrate; and a mirror housing secured to the mirror element so as to extend behind the rear surface of the substrate and around the one of the ball stud and the socket that is attached to the rear surface.

According to another aspect of the present disclosure, a method is provided for constructing a rearview mirror assembly for a vehicle. The method comprises the sequentially performed steps of: preassembling a mirror element having at least one substrate including a front surface and a rear surface; adhesively attaching one of a ball stud and a socket of a mounting mechanism to the rear surface of the substrate; and securing a mirror housing to the mirror element so as to extend behind the rear surface of the substrate and around the one of the ball stud and the socket that is attached to the rear surface.

These and other features, advantages, and objects of the present invention will be further understood and appreciated by those skilled in the art by reference to the following specification, claims, and appended drawings.

DETAILED DESCRIPTION

Figure 1:
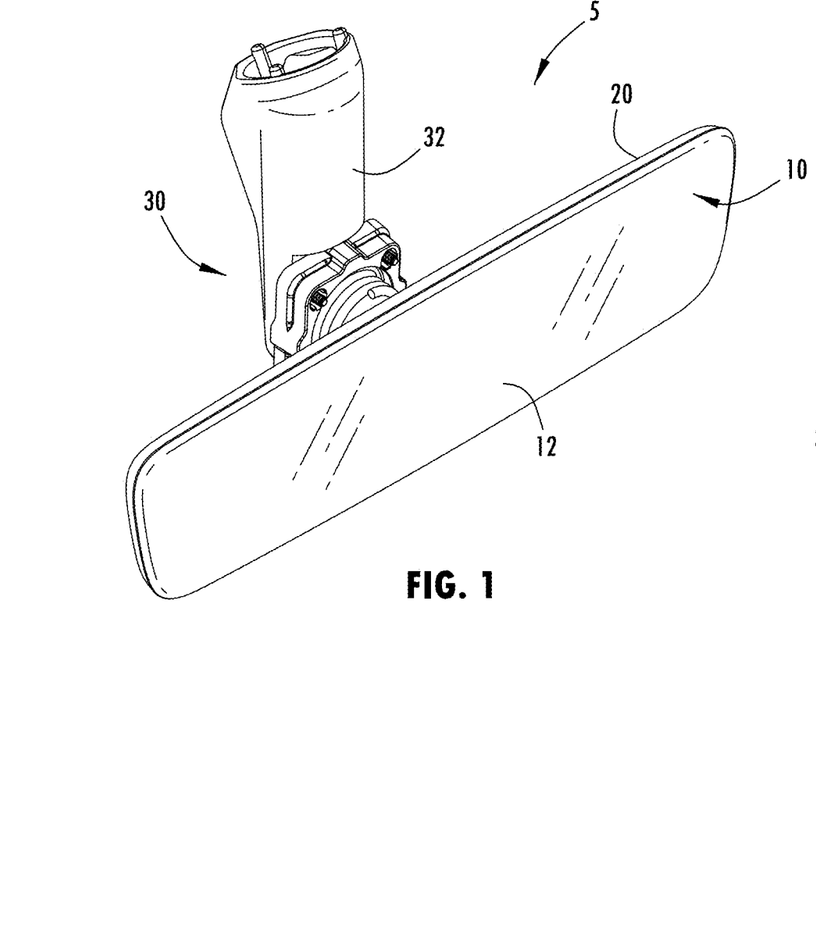
FIG. 1 is a perspective view of the front of a rearview mirror assembly constructed in accordance with a first embodiment.
Figure 2:
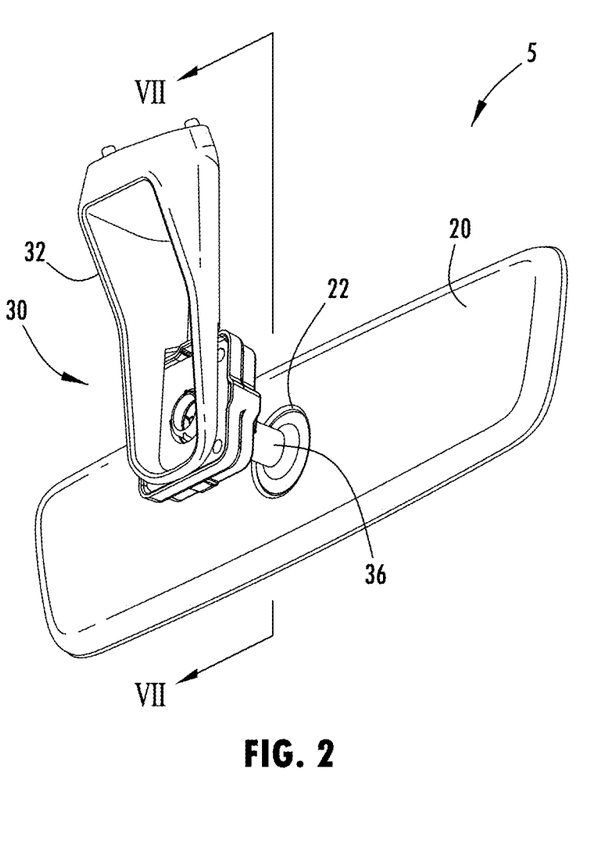
FIG. 2 is a perspective view of the rear of the rearview mirror assembly shown in FIG. 1.
Figure 3:
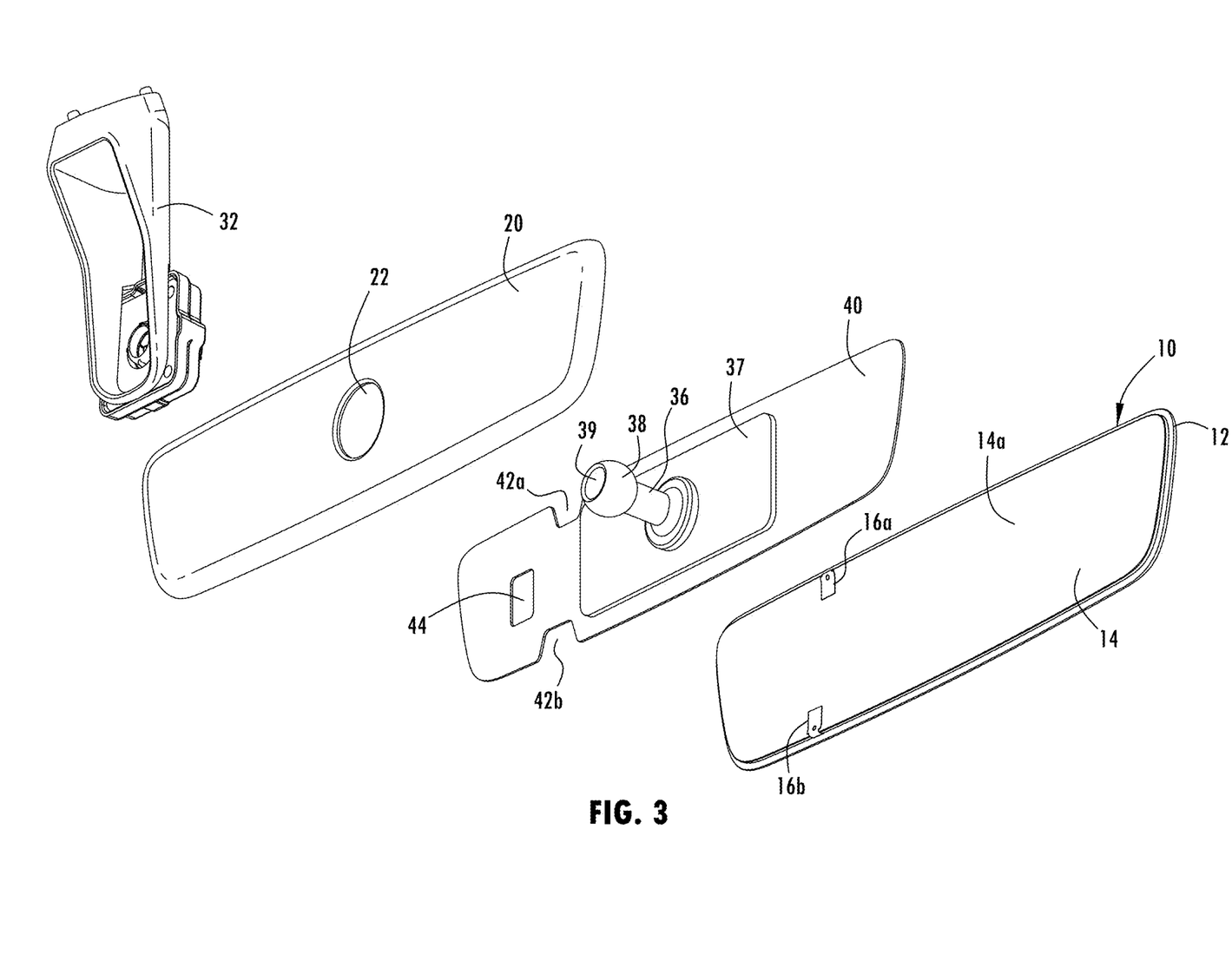
FIG. 3 is a partially exploded perspective view of the rearview mirror assembly shown in FIGS. 1 and 2.
Figures 4, 5:
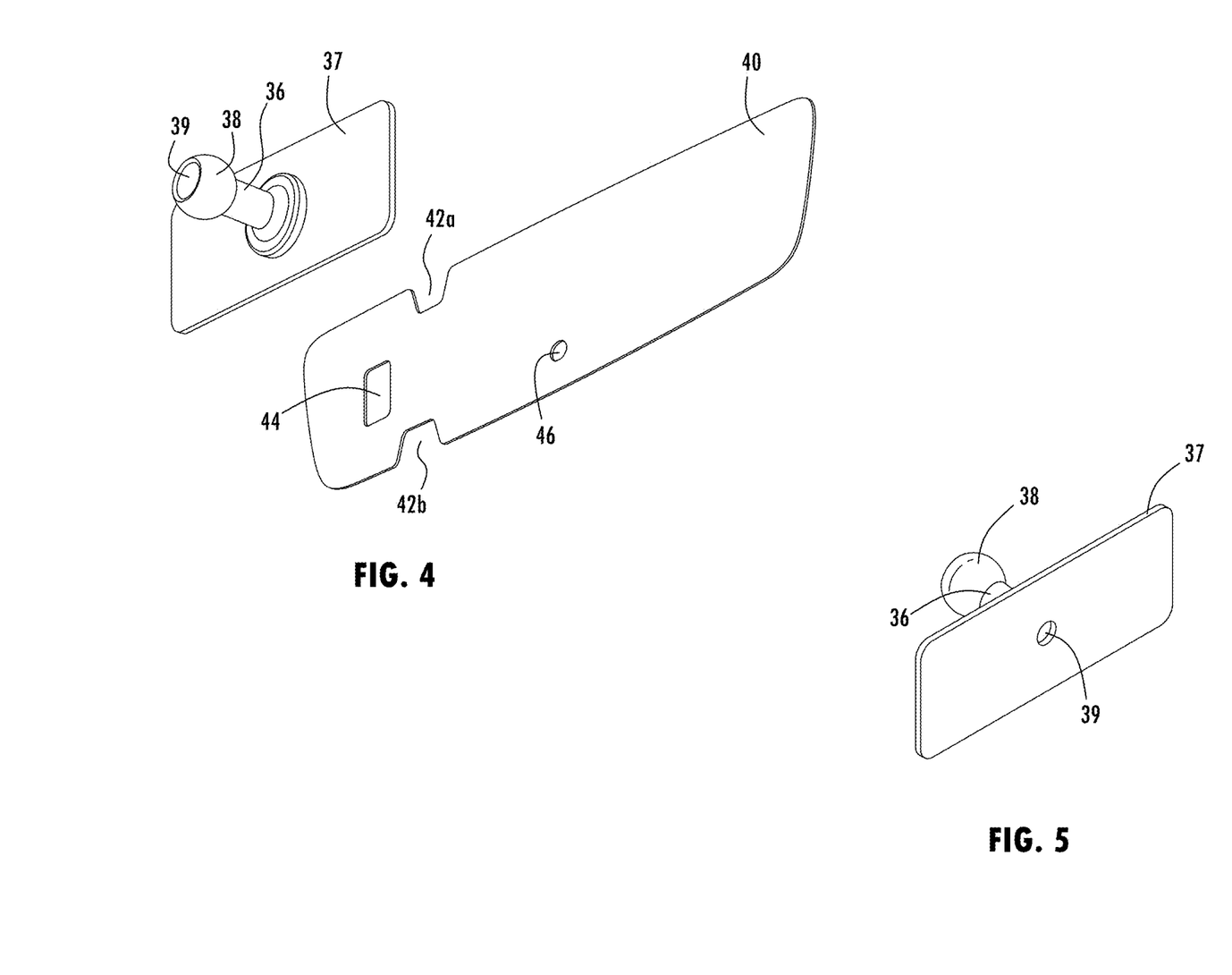
FIG. 4 is an exploded perspective view of a ball stud and adhesive pad used in the rearview mirror assembly of FIGS. 1-3.
FIG. 5 is a perspective view of the ball stud shown in FIG. 4.

For purposes of description herein, the terms "upper," "lower," "right," "left," "rear," "front," "vertical," "horizontal," and derivatives thereof shall relate to the invention as oriented in FIG. 1. Unless stated otherwise, the term "front" shall refer to the surface of the mirror closer to an intended viewer of the mirror, and the term "rear" shall refer to the surface of the element further from the intended viewer of the mirror. However, it is to be understood that the invention may assume various alternative orientations, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements, but may include other elements not expressly listed or inherent to such process, method, article, or apparatus. An element preceded by "comprises a . . . " does not, without more constraints, preclude the existence of additional identical elements in the process, method, article, or apparatus that comprises the element.

Rearview mirror assemblies are known that include a mirror housing, a mirror element secured to the mirror housing, and a mounting mechanism having a ball and socket construction whereby the socket is attached to the mirror housing using screws, and the ball extends from a mounting stem that is attached to the vehicle at the opposite end. With this construction, the mirror housing needs to be made sufficiently thick to allow the socket to be screwed in and to provide structural support for the mirror element and possibly one or more circuit boards.

In the figures, a vehicle rearview mirror assembly 5, 5a is shown that includes: a mirror element 10 having at least one substrate 14 including a front surface and a rear surface 14a; a mounting mechanism 30, 30a configured to be mounted to the vehicle, the mounting mechanism 30, 30a including a ball stud 36, 36a and a socket 34, 34a for receiving a ball 38, 38a of the ball stud 36, 36a, wherein the mounting mechanism 30, 30a is further configured such that one of the ball stud 36, 36a and the socket 34, 34a is adhesively attached to the rear surface 14a of the substrate 14; and a mirror housing 20, 20a secured to the mirror element 10 so as to extend behind the rear surface 14a of the substrate 14 and around the one of the ball stud 36, 36a and the socket 34, 34a that is attached to the rear surface 14a. The mirror assembly 5, 5a may include an adhesive pad 40 between the rear surface 14a of the substrate 14 and the one of the ball stud 36, 36a and the socket 34, 34a that is attached to the rear surface 14a.

FIGS. 1-7 show a rearview mirror assembly 5 according to a first embodiment wherein the ball stud 36 is attached to the rear surface 14a of the substrate 14 and FIGS. 8-14 show a rearview mirror assembly 5a according to a second embodiment wherein the socket 34a is attached to the rear surface 14a of the substrate 14.

By adhesively securing either the ball stud 36, 36a or the socket 34, 34a to the rear surface 14a of the substrate 14, the need for screws is eliminated along with the associated manufacturing time and cost. Also, the mirror assembly 5, 5a may be made with a thinner profile and a lower weight, which reduces vibrations and associated potential blurriness of the reflected image from a vibrating mirror.

Looking first at the embodiment shown in FIGS. 1-7, the rearview mirror assembly 5 includes a mounting mechanism 30 having a mounting bracket 32. The mounting bracket 32 may have an upper end configured for attachment to a headliner or an overhead console of the vehicle and an opposite end provided with a socket 34. The mounting mechanism 30 may further include a ball stud 36 having a ball 38 that is received by the socket 34. The socket 34 tightly secures the ball 38 so that the ball 38 can only rotate within the socket 34 when sufficient force is applied. This allows a person to adjust the position of the mirror element 10 and have the mirror element thereafter retain its position as is known in the art.

Figure 6:
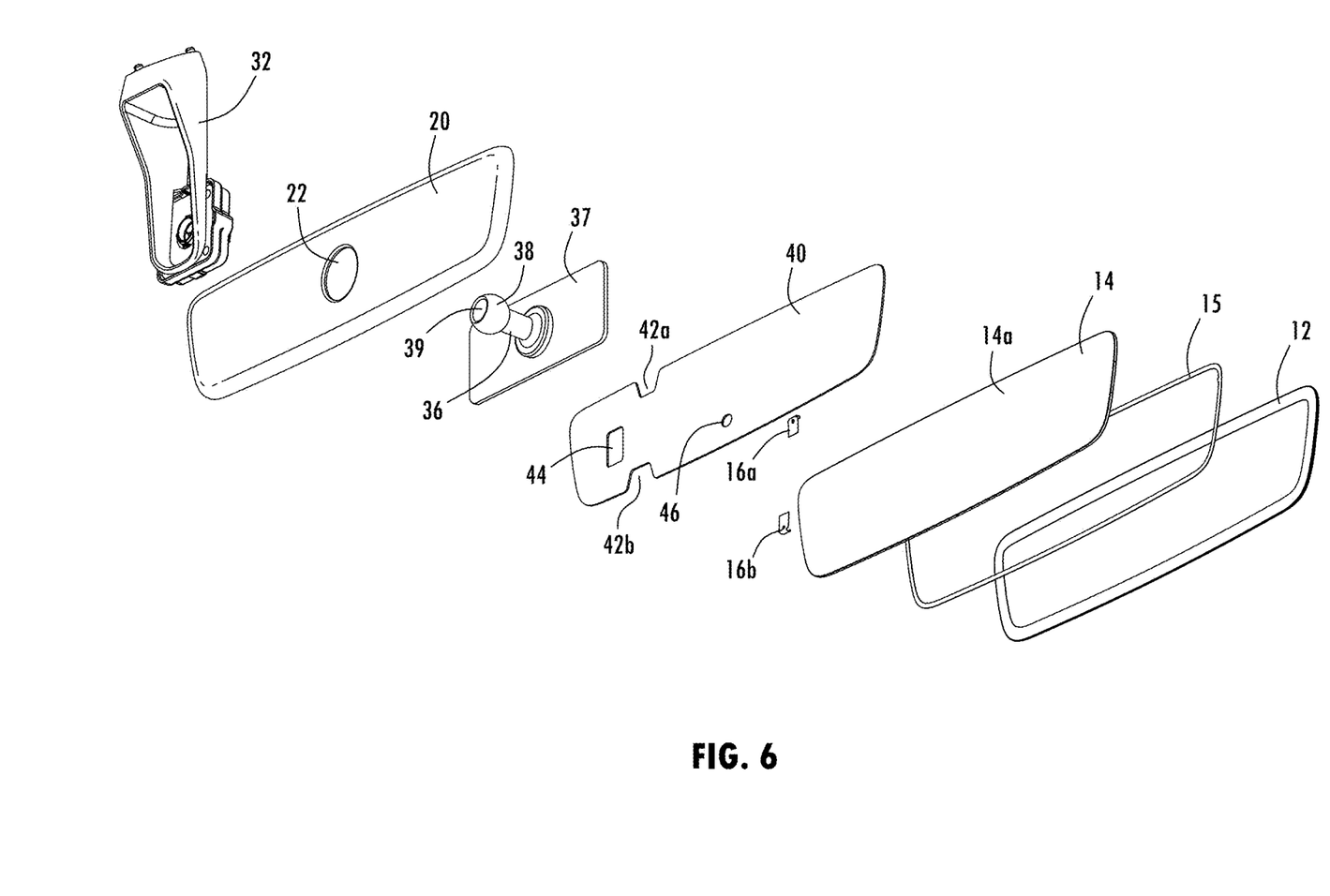
FIG. 6 is an exploded perspective view of the rearview mirror assembly shown in FIGS. 1-4.
Figure 7:
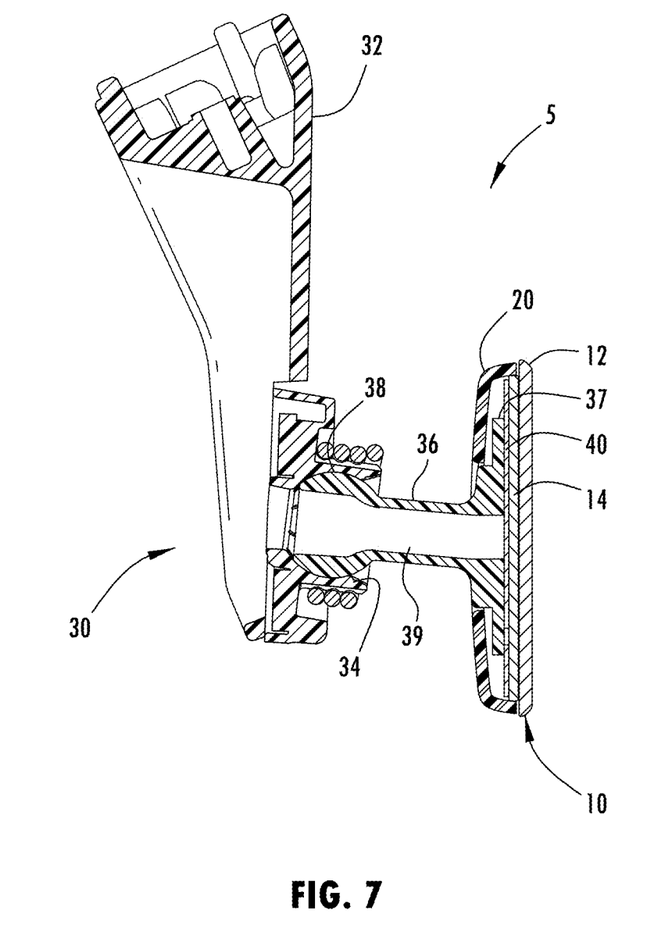
FIG. 7 is a cross-sectional view of the rearview mirror assembly shown in FIGS. 1-4 and 6 taken along line VII-VII in FIG. 2.
Figure 8:
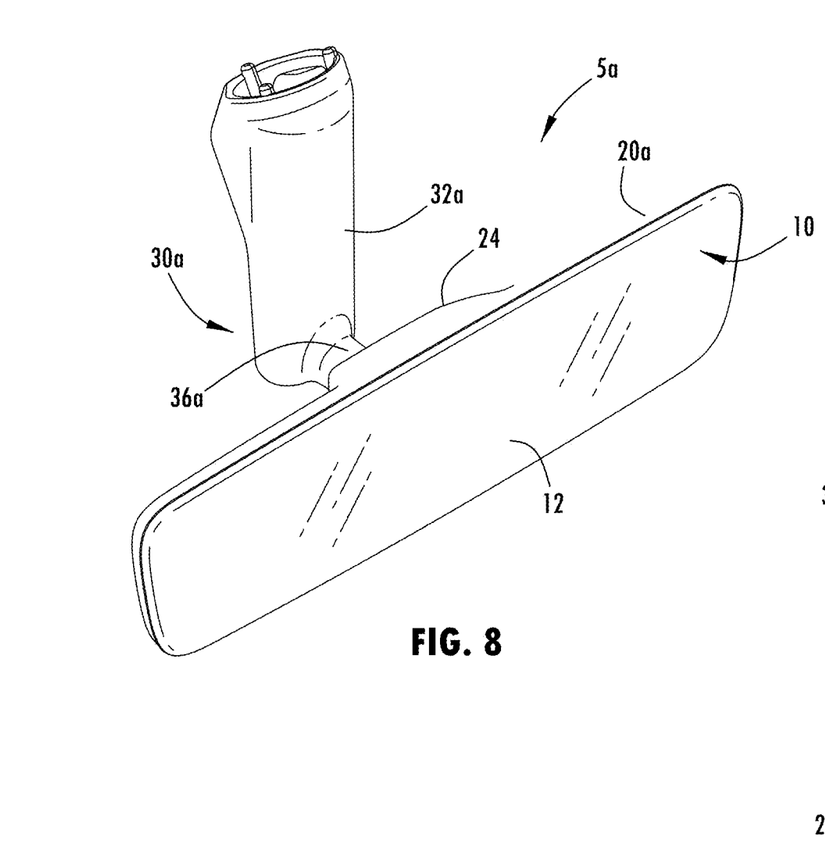
FIG. 8 is a perspective view of the front of a rearview mirror assembly constructed in accordance with a second embodiment.
Figure 9:
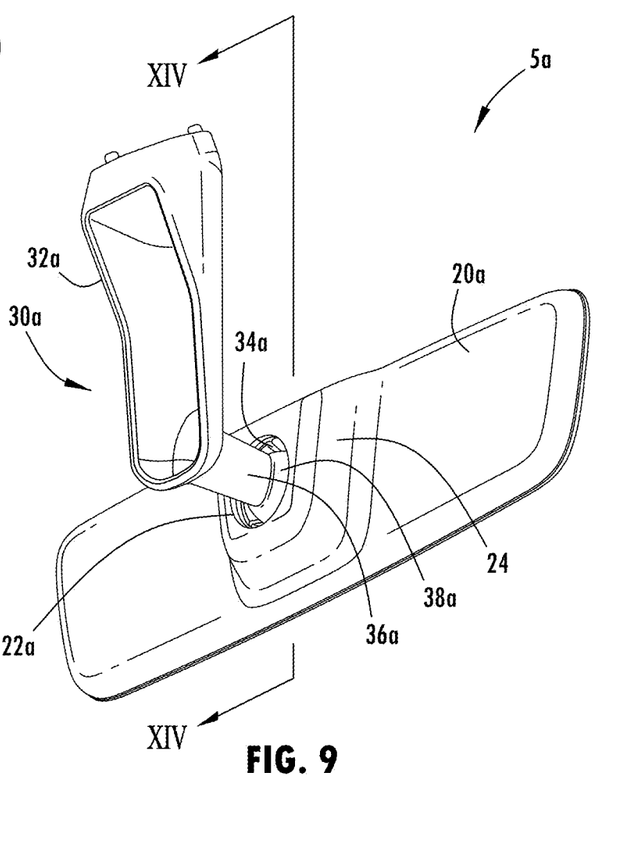
FIG. 9 is a perspective view of the rear of the rearview mirror assembly shown in FIG. 8.
Figure 10:
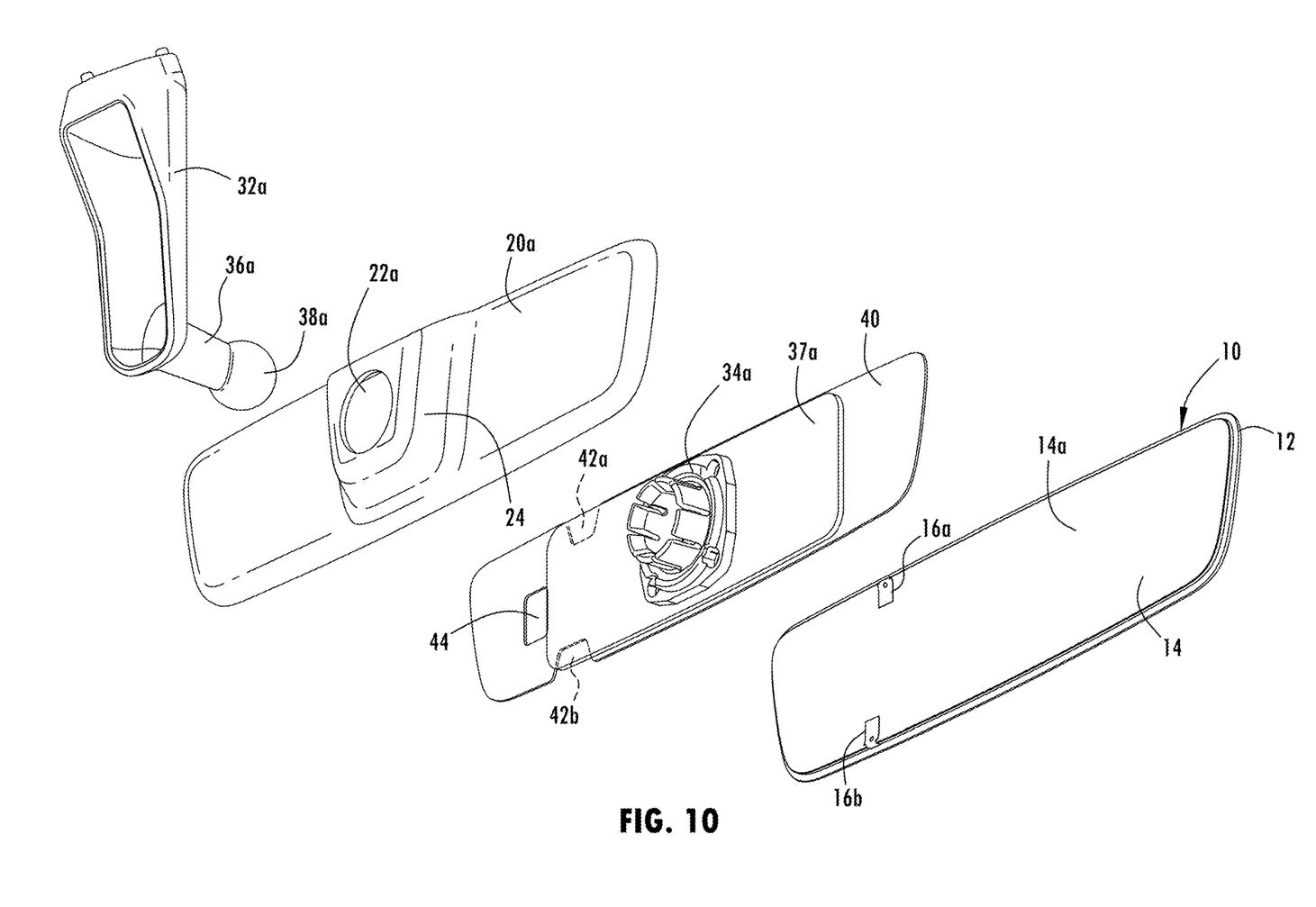
FIG. 10 is a partially exploded perspective view of the rearview mirror assembly shown in FIGS. 8 and 9.
Figure 11:
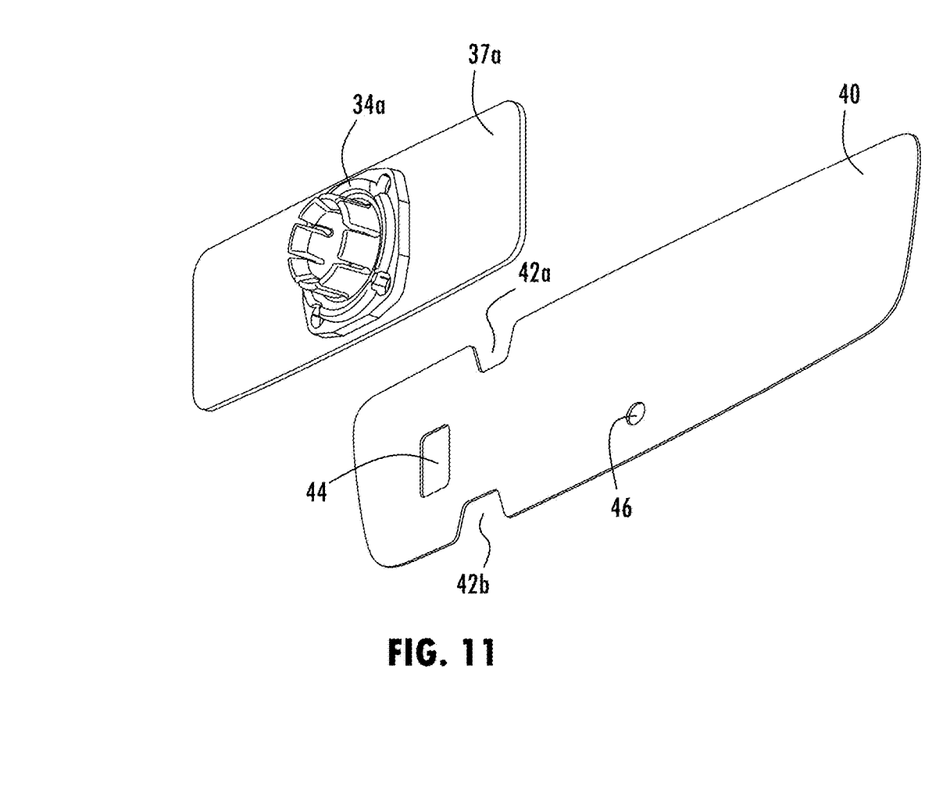
FIG. 11 is an exploded perspective view of the rear of a socket used in the rearview mirror assembly of FIGS. 8-10.
Figure 12:
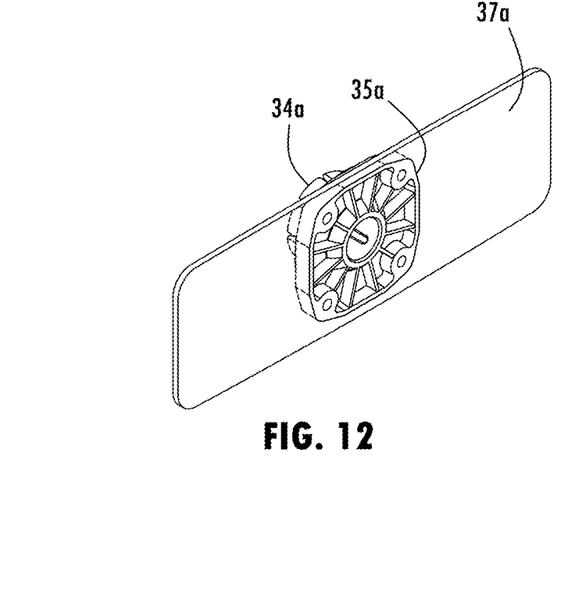
FIG. 12 is a perspective view of the front of the socket shown in FIG. 11.
Figure 13:
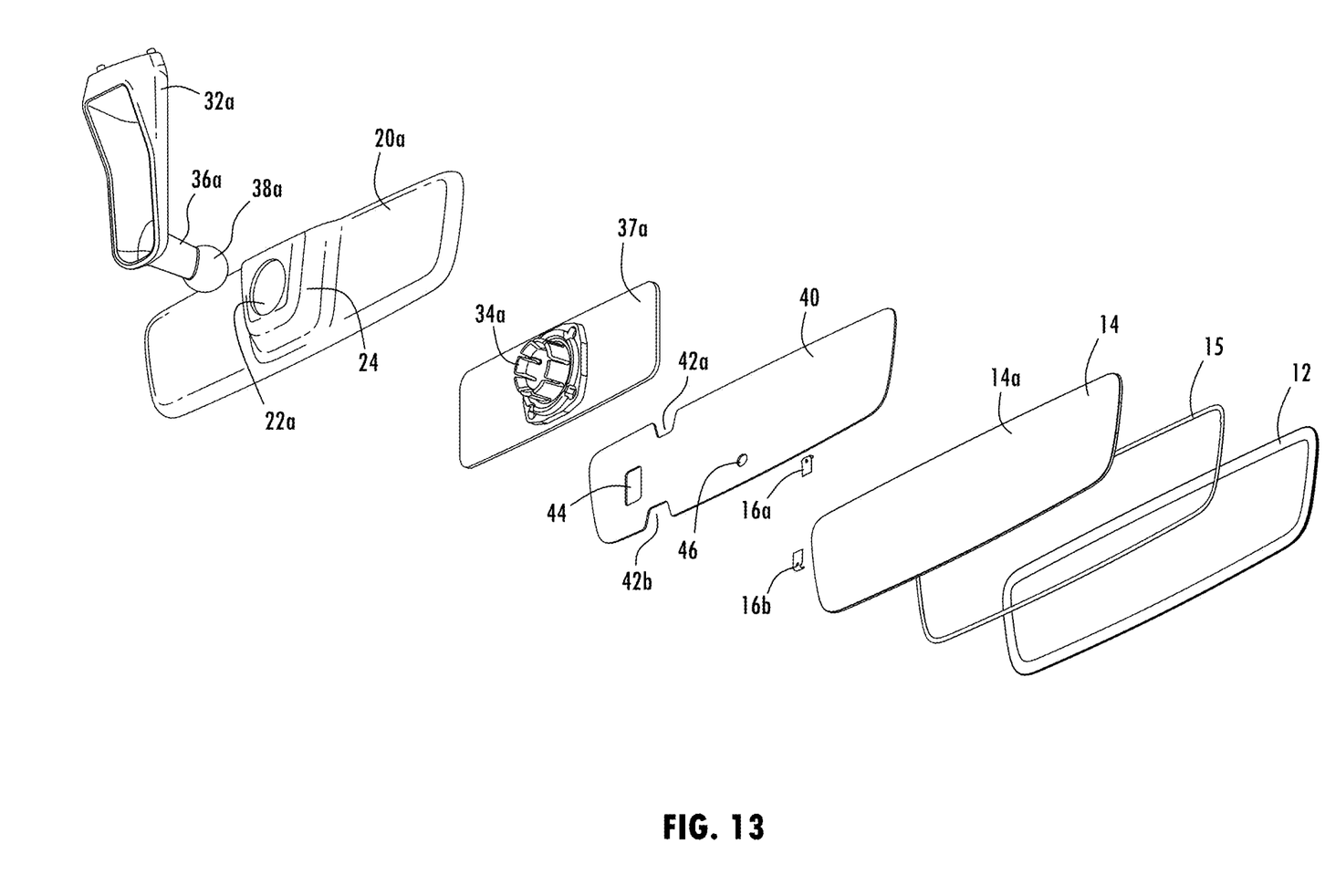
FIG. 13 is an exploded perspective view of the rearview mirror assembly shown in FIGS. 8-11.
Figure 14:
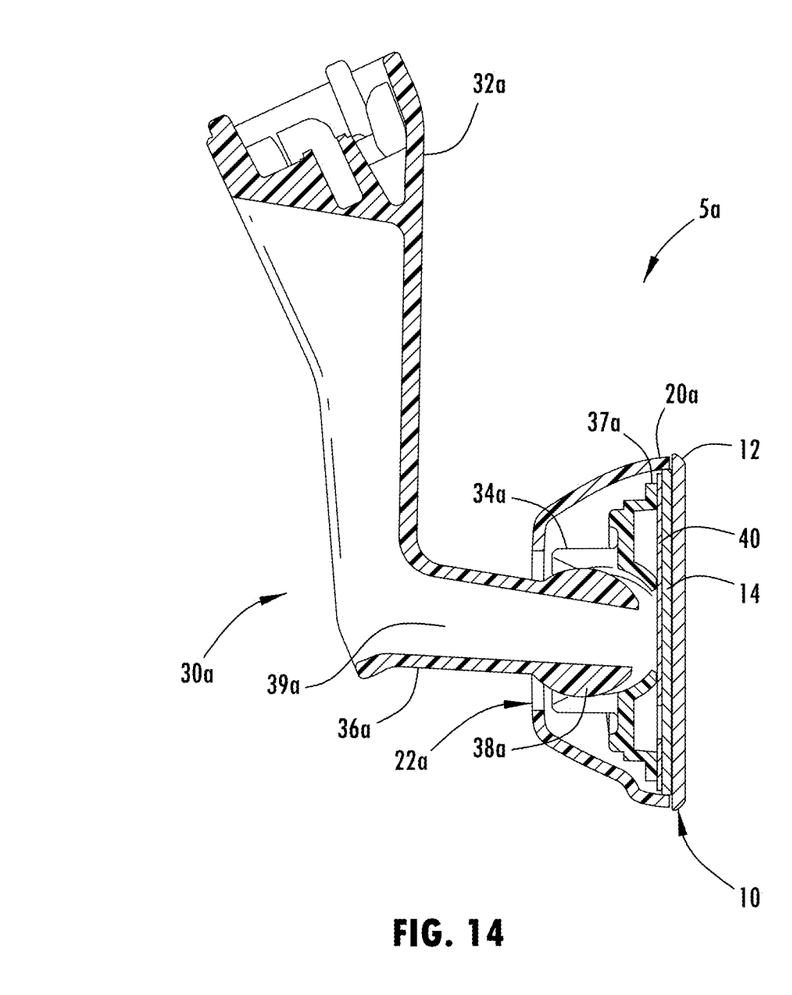
FIG. 14 is a cross-sectional view of the rearview mirror assembly shown in FIGS. 8-11 and 13 taken along line XIV-XIV in FIG. 9.

As best shown in FIG. 6, the mirror element 10 may be an electro-optic mirror element such as an electrochromic mirror element whose reflection may be automatically changed in response to a voltage differential. Such electrochromic mirror elements are known in the art and typically include a front substrate 12, a rear substrate 14, and a perimeter seal 15 provided between the substrates 12 and 14 in order to provide a sealed chamber in which an electrochromic medium (not shown) is provided. The substrates 12 and 14 may be made of glass or plastic. Electrodes (not shown) are typically provided on the inner-facing surfaces of the substrates 12 and 14 such that the voltage differential may be applied across the electrochromic medium disposed therebetween. A reflective layer (not shown) is provided on a surface of the rear substrate 14 and may serve as one of the electrodes. A pair of conductive clips 16a and 16b may be in contact with the electrodes. Wires (not shown) may be connected to the clips 16a and 16b for allowing the voltage differential to be applied from a control circuit (not shown). Typically, such a control circuit is provided on a printed circuit board in the mirror housing 20 behind the mirror element 10 and includes an ambient light sensor and a glare light sensor whose detected light levels are used to control the reflectivity of the mirror element 10. However, in order to further reduce the profile thickness and weight of the mirror assembly, the control circuit may be mounted elsewhere in the vehicle and the ambient and glare light readings may be obtained from the vehicle's forward- and rearward-facing cameras. In this way, no circuit board is needed in the mirror assembly and the ball stud 36 may be adhered to the rear surface 14a of the rear substrate 14, and the mirror housing 20 may be configured to be purely provided for aesthetic purposes and thus would not require ribs or other strengthening members for structure support of the mirror element 10. Thus, the mirror housing 20 may be adhered to the mirror element 10 such as by the adhesive pad 40, for example, or by other means. The mirror housing 20 may thus be much thinner in profile and much lighter. Further, by placing the control circuit for the mirror element 10 elsewhere in the vehicle, only two wires (not shown) need to be run through a wire passageway 39, 39a of the mounting mechanism 30 to the conductive clips 16a and 16b thereby further simplifying the construction of the mirror assembly 5.

As best shown in FIGS. 3-7, the ball stud 36 may further include a mounting plate 37 for increasing the surface area of the ball stud 36 for adhering to the rear surface 14a of the rear substrate 14 via the optional adhesive pad 40. The plate 37 may extend parallel to the rear surface 14a. The plate 37 not only increases the strength of adhesion, but also increases the leverage applied to the ball-and-socket connection by a person attempting to adjust the mirror element position.

The optional adhesive pad 40 may be sized to just fit under the mounting plate 37 or may be larger than the plate 37 and extend beyond the plate 37. The mirror housing 20 may be adhered to those portions of the adhesive pad that extend beyond the edges of the mounting plate 37 to secure the housing 20 to the mirror element 10. Insofar as the prior mirror assemblies attached the ball stud or socket to the mirror housing, such prior mirror housings had to have sufficient strength to in turn support the mirror element and any circuit boards housed therein. The adhesive pad 40 may include cutouts 42a and 42b for providing clearance for the conductive clips 16a and 16b, respectively. The adhesive pad 40 may optionally include apertures 44 and 46 for receiving corresponding protrusions (not shown) from the mirror housing 20 and plate 37 for registration purposes.

To assemble the mirror assembly 5, the mirror element 10 may be pre-assembled. The adhesive or adhesive pad 40 may be applied to the rear surface 14a of the rear substrate 14 or to the plate 37 of the ball stud 36. Wires may be attached to the conductive clips 16a and 16b and run through the wire passageway 39. Next, the ball stud 36 may be secured to the rear surface 14a. The mirror housing 20 may then be attached to the mirror element 10 such that the ball stud 36 extends through an aperture 22 in the mirror housing 20. The wires may then be passed through the socket 34 and the mounting bracket 32, and the ball 38 of ball stud 36 is pressed into the socket 34 where it is held in place by the spring force of the socket 34.

Now looking at the second embodiment shown in FIGS. 8-14, the rearview mirror assembly 5a differs from the first embodiment in that the socket 34a is adhesively attached to the rear surface 14a of substrate 14 and the ball stud 36a extends from the mounting bracket 32a. Parts of the second embodiment that are the same as in the first embodiment retain the same reference numbers and are not described in detail in the description below.

The rearview mirror assembly 5a includes a mounting mechanism 30a having a mounting bracket 32a. The mounting bracket 32a may have an upper end configured for attachment to a headliner or an overhead console of the vehicle and an opposite end provided with a ball stud 36a having a ball 38a. The mounting mechanism 30a may further include a socket 34a for receiving the ball 38a. The socket 34a tightly secures the ball 38a so that the ball 38a can only rotate within the socket 34a when sufficient force is applied. This allows a person to adjust the position of the mirror element 10 and have the mirror element 10 thereafter retain its position as is known in the art.

As described above, the mirror element 10 may be an electro-optic mirror element and the control circuit may be located elsewhere in the vehicle. Thus, because no circuit board is needed in the mirror assembly 5a, the socket 34a may be adhered to the rear surface 14a of the rear substrate 14 and the mirror housing 20a may be configured to be purely provided for aesthetic purposes and thus would not require ribs or other strengthening members for structure support of the mirror element 10. Thus, the mirror housing 20a may be adhered to the mirror element 10 such as by the adhesive pad 40, for example, or by other means. The housing 20a may thus be much thinner in profile and much lighter. Further, by placing the control circuit for the mirror element 10 elsewhere in the vehicle, only two wires (not shown) need to be run through a wire passageway 39 of the mounting mechanism 30a to the conductive clips 16a and 16b thereby further simplifying the construction of the mirror assembly 5a.

As best shown in FIGS. 10-14, the socket 34a may further include a plate 37a for increasing the surface area of the socket 34a for adhering to the rear surface 14a of the rear substrate 14 via the optional adhesive pad 40. The plate 37a may include an aperture 35a (FIG. 12) for receiving the socket 34a. The plate 37a not only increases the strength of adhesion, but also increases the leverage applied to the ball-and-socket connection by a person attempting to adjust the mirror element position.

The optional adhesive pad 40 may be sized to just fit under the plate 37a or may extend beyond the plate 37a so as to secure the mirror housing 20a to the mirror element 10. Insofar as the prior mirror assemblies attached the ball stud or socket to the mirror housing, such prior mirror housings had to have sufficient strength to in turn support the mirror element and any circuit boards housed therein.

The mirror housing 20a may have a rearwardly protruding portion 24 that extends back and over the socket 34a.

To assemble the mirror assembly 5a, the mirror element 10 may be pre-assembled. The adhesive or adhesive pad 40 may be applied to the rear surface 14a of the rear substrate 14 or to the plate 37a of the socket 34a. Wires may be attached to the conductive clips 16a and 16b and run through the socket 34a. Next, the socket 34a/plate 37a may be secured to the rear surface 14a. The mirror housing 20a may then be attached to the mirror element 10 such that the socket 34a is accessible through an aperture 22a in the mirror housing 20a. The wires may then be passed through the wire passageway 39 in the ball stud 36a and the mounting bracket 32a, and the ball 38a of ball stud 36a is pressed into the socket 34a where it is held in place by the spring force of the socket 34a.

While an adhesive pad 40 is shown and described above, a layer of adhesive could otherwise be provided as an alternative to the pad.

Although the mounting mechanism 30 is shown and described as being mounted to a headliner or overhead console of a vehicle, the mechanism 30 may be configured for mounting to the inside of the vehicle's windshield using conventional techniques.

Further, although the mounting mechanism 30 is shown and described as having a single ball and socket construction, it may instead have a double-ball and socket construction.

In addition, even though the mirror element 10 is shown and described as an electrochromic mirror element, it may be any other form of electro-optic mirror element or a prismatic mirror element.

The above rearview mirror assemblies 5, 5a may be constructed using a novel method that includes the sequentially performed steps of: preassembling a mirror element 10 having at least one substrate 14 including a front surface and a rear surface 14a; adhesively attaching one of a ball stud 36, 36a and a socket 34, 34a of a mounting mechanism 30, 30a to the rear surface 14a of the substrate 14; and securing a mirror housing 20, 20a to the mirror element 10 so as to extend behind the rear surface 14a of the substrate 14 and around the one of the ball stud 36, 36a and the socket 34, 34a that is attached to the rear surface 14a. The step of adhesively attaching one of the ball stud 36, 36a and the socket 34, 34a to the rear surface 14a may include applying an adhesive pad 40 between the rear surface 14a of the substrate 14 and the one of the ball stud 36, 36a and the socket 34, 34a. The one of the ball stud 36, 36a and the socket 34, 34a that is attached to the rear surface 14a may include a mounting plate 37 that extends parallel to the rear surface 14a. The adhesive pad 40 may be larger than the mounting plate 37 and extend along the rear surface 14a beyond edges of the mounting plate 37. The housing 20, 20a may be attached to the adhesive pad 40 where it extends beyond the edges of the mounting plate 37. The method may further include the step of attaching the one of the ball stud 36, 36a and the socket 34, 34a to the other one of the ball stud 36, 36a and the socket 34, 34a of the mounting mechanism 30.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A rearview mirror assembly for a vehicle, comprising:
    a mirror element having at least one substrate including a front surface and a rear surface;
    a mounting mechanism configured to be mounted to the vehicle, the mounting mechanism including a ball stud and a socket for receiving a ball of the ball stud, wherein the mounting mechanism is further configured such that one of the ball stud and the socket is adhesively attached to the rear surface of the substrate;
    a mirror housing secured to the mirror element so as to extend behind the rear surface of the substrate and around the one of the ball stud and the socket that is attached to the rear surface; and
    an adhesive pad between the rear surface of the substrate and the one of the ball stud and the socket that is attached to the rear surface,
    wherein the one of the ball stud and the socket that is attached to the rear surface includes a mounting plate that extends parallel to the rear surface.

2. The rearview mirror assembly of claim 1, wherein the adhesive pad is larger than the mounting plate and extends along the rear surface beyond edges of the mounting plate.

3. The rearview mirror assembly of claim 2, wherein the housing is attached to the adhesive pad where it extends beyond the edges of the mounting plate.

4. The rearview mirror assembly of claim 1, wherein the ball stud is attached to the rear surface and the socket is attached to a mounting bracket of the mounting mechanism.

5. The rearview mirror assembly of claim 1, wherein the socket is attached to the rear surface and the ball stud extends from a mounting bracket of the mounting mechanism.

6. The rearview mirror assembly of claim 1, wherein the one of the ball stud and the socket that is attached to the rear surface is attached to the rear surface by a layer of adhesive.

7. The rearview mirror assembly of claim 1, wherein the mirror element is a prismatic mirror element.

8. The rearview mirror assembly of claim 1, wherein the mirror element is an electro-optic mirror element.

9. The rearview mirror assembly of claim 1, wherein the at least one substrate is made of glass.

10. A rearview mirror assembly for a vehicle, the rearview mirror assembly comprising:
    an electrochromic mirror element having a front substrate and a rear substrate behind the front substrate, the rear substrate including a front surface and a rear surface;
    a mounting mechanism configured to be mounted to the vehicle, the mounting mechanism including a ball stud and a socket for receiving a ball of the ball stud, wherein the mounting mechanism is further configured such that one of the ball stud and the socket includes a mounting plate that is adhesively attached to the rear surface of the rear substrate; and
    a mirror housing secured to the mirror element so as to extend behind the rear surface of the rear substrate and around the one of the ball stud and the socket that is attached to the rear surface.

11. The rearview mirror assembly of claim 10 and further comprising an adhesive pad between the rear surface of the rear substrate and the mounting plate.

12. The rearview mirror assembly of claim 11, wherein the adhesive pad is larger than the mounting plate and extends along the rear surface beyond edges of the mounting plate.

13. The rearview mirror assembly of claim 12, wherein the housing is attached to the adhesive pad where it extends beyond the edges of the mounting plate.

14. The rearview mirror assembly of claim 10, wherein the mounting plate is attached to the rear surface by a layer of adhesive.

15. A method of constructing a rearview mirror assembly for a vehicle, the method comprising the sequentially performed steps of:
    preassembling a mirror element having at least one substrate including a front surface and a rear surface;
    adhesively attaching one of a ball stud and a socket of a mounting mechanism to the rear surface of the substrate; and
    securing a mirror housing to the mirror element so as to extend behind the rear surface of the substrate and around the one of the ball stud and the socket that is attached to the rear surface, wherein:
    the step of adhesively attaching one of the ball stud and the socket to the rear surface includes applying an adhesive pad between the rear surface of the substrate and the one of the ball stud and the socket;
    the one of the ball stud and the socket that is attached to the rear surface includes a mounting plate that extends parallel to the rear surface;
    the adhesive pad is larger than the mounting plate and extends along the rear surface beyond edges of the mounting plate; and the housing is attached to the adhesive pad where it extends beyond the edges of the mounting plate.

16. The method of claim 15 and further comprising the step of attaching the one of the ball stud and the socket to the other one of the ball stud and the socket of the mounting mechanism.

\* \* \* \* \*